United States Patent [19]

Fanella et al.

[11] 3,724,779

[45] Apr. 3, 1973

[54] CASSETTE PLAYBACK AND/OR RECORDING APPARATUS WITH LOADING EASE FEATURE

[75] Inventors: Robert J. Fanella, Villa Park; Donald W. Marcinkus, Arlington Heights; Glenn E. Sterly, Carol Stream, all of Ill.

[73] Assignee: Ampex Corporation, Redwood City, Calif.

[22] Filed: Dec. 23, 1970

[21] Appl. No.: 100,872

[52] U.S. Cl. ....................................242/198, 274/4 F

[51] Int. Cl.......G03b 1/04, G11b 15/32, G11b 23/04

[58] Field of Search.........242/198, 199; 274/4 E, 4 F

[56] References Cited

UNITED STATES PATENTS 3,494,572 2/1970 Uemura................................242/198

3,561,767 2/1971 Negishi................................274/4 F

*Primary Examiner*—Leonard D. Christian

*Attorney*—Anderson, Luedeka, Fitch, Even and Tabin

[57] ABSTRACT

A significant reduction in the amount of manual force required to insert a cassette into operative position within a tape playback and/or recording apparatus is achieved by means sensing the inward movement of the cassette and a carriage movable thereby and means operated by the sensing means to shift some of the operating mechanisms in the apparatus against spring forces and friction forces. The means for sensing the inward movement of the cassette and carriage may be in the form of a cam surface on a pawl or lever which is pivoted to operate a switch to cause operation of means including a "repeat" solenoid to shift the tape transporting means to place a forward feed pinch roller in operative and the reverse feed pinch roller in an inoperative position independently of the manual force inserting the cassette and moving the carriage.

7 Claims, 5 Drawing Figures

INVENTORS
ROBERT J. FANELLA
DONALD W. MARCINKUS
GLENN E. STERLY
Anderson, Luedeka, Fitch, Even & Tabin
ATTYS

INVENTORS
ROBERT J. FANELLA
DONALD W. MARCINKUS
GLEN E. STERLY

Anderson, Luedeka, Fitch, Even & Tabin
ATTYS

CASSETTE PLAYBACK AND/OR RECORDING APPARATUS WITH LOADING EASE FEATURE

This invention relates to a tape player and/or recording apparatus in which a tape cassette is manually loaded by inserting the cassette into a slot and exerting an inward push on the cassette; and more particularly to providing means for easing the loading push needed to insert the cassette into operative position for playback or recording.

The present invention is employed in a known type of tape playing and/or recording apparatus in which the inserted cassette engages lugs on a carriage which must be pushed manually with sufficient force to overcome friction forces, spring forces for various mechanisms, and carriage return spring forces which are used to eject the cassette after use. For lightweight tape playing or recording apparatus, the manual forces required to insert the cassette and to shift the various mechanisms is such that the tape deck may actually slide along a supporting surface or table and prevent insertion of the cassette into the operative position unless the apparatus is held against sliding. Also, where the tape cassette is pushed into a lightweight playing and/or recording apparatus at an oblique angle to the horizontal, the force required to overcome the springs, friction, etc. may be such as to cause it to tilt with the front lower edge lifting from the supporting table and thereby preventing cassette insertion without someone manually holding the apparatus. In addition to causing sliding, such large loading forces are uncomfortable to women and others.

An appreciation of the forces needed to be overcome during loading is best understood by a detailed reference to the illustrated embodiment of the invention in which the inserted cassette engages and pushes the carriage forwardly and causes the carriage to automatically swing spindles into the tape reels in the cassette and to project tape driving capstans into openings in the cassette to cooperate with forward and reverse feeding pinch rolls to cause the tape to feed and to begin a playing back or recording operation.

Inward movement of the carriage by the cassette also swings the reverse feed pinch roller to an inoperative position and swings the forward feed pinch roller into engagement with the tape to feed it in a first direction to play the first track of the tape. After the tape has been transported in the forward direction from one reel to the other reel in the cassette, the direction of tape transport is automatically reversed to play the second track of the tape by shifting the reverse feed pinch roller into engagement with the tape while shifting the forward feed pinch roller from the tape. Then following the playing of the second track of the tape, the carriage, which was latched in an operative playing position, may be unlatched and the carriage springs are free to return the carriage and eject the cassette whereby the user may remove the cassette from the apparatus. In the cassette player described herein, the playback and recording apparatus may be positioned in a repeat mode of operation, in which the cassette is not automatically ejected after playing track two; but instead a repeat solenoid is operated to shift side one into play with the forward feed, pinch roller again returned to operative position to replay track one of the tape.

Accordingly, an object of the present invention is to alleviate the manual force required to load a tape cassette into operative position within a playback and/or recording apparatus.

Other objects and advantages of the invention will become apparent from the following detailed description accompanying the drawings in which.

Figure 2:
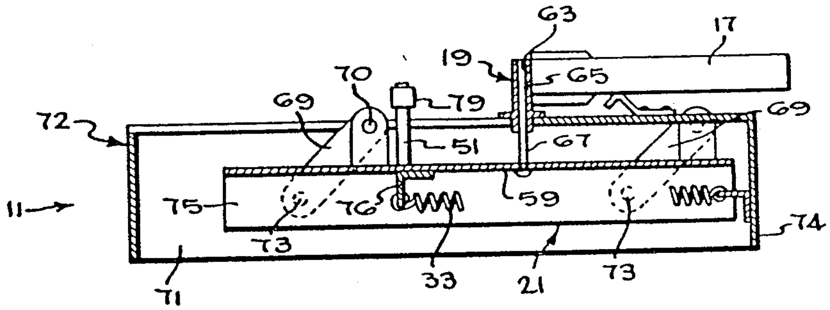
FIG. 2 is a cross-sectional view showing a swingable carriage movable by a cassette.

As shown in the drawings for purposes of illustration, the invention is embodied in a tape playback and/or recording apparatus 11 which has at one horizontal side 12 thereof a pair of spaced guide rails 14 defining therebetween a horizontally disposed slot into which may be manually inserted a tape cassette 17. As the cassette 17 moves inwardly, it abuts a pair of upright lugs 19 which are associated with a movable carriage 21, shown in FIG. 2. By pushing the cassette 17 inwardly, i.e., to the left as viewed in FIG. 2, the movable carriage swings upwardly to insert spindles 23 and 25 (FIG. 1) into reels 26 and 27 in the cassette and inserts a pair of tape driving capstans 28 and 29 into position behind a magnetic tape 31. the upward swinging of the carriage stretches carriage return springs 33 and also inward movement of the carriage is resisted by springs in various mechanisms such as spring 35 of a latch pawl 37 which will ultimately latch the carriage and the cassette in the operative position at which the tape 31 is positioned for movement past a sound transducer head 39. Also, during the insertion of the carriage, means in the form of a cam slider 41, as best seen in FIG. 3, must be shifted against a spring force of a spring 43 to place a forward feed pinch roller 45 into operative position with the tape while a reverse feed pinch roller 47 is shifted to a position remote and spaced from the tape. As will be explained, the spring 43 serves to return the cam slider 41 and shift the reverse feed pinch roller into engagement with the tape at the end of forward tape transport from the reel 27 to the reel 26 and causes tape transport in the reverse direction.

In accordance with the present invention, a significant reduction in the amount of manual force required to insert the cassette 17 and to shift the carriage 21 and various mechanisms is achieved by sensing the inward movement of the carriage 21 and cassette 17 by a sensing means and by operating a solenoid 49 to shift some of the operating mechanisms against spring forces thereby reducing the amount of spring force and friction forces needed to be overcome manually. More specifically, during its initial inward movement, the carriage 21 carries a pin 51 against a sensing means in the form of a cam surface 53 on the latch pawl 37 which pivots, from the position shown in FIG. 1 to the position shown in FIG. 4, to operate a switch 55 in a control circuit 56, FIG. 5, for the "repeat" solenoid 49. The solenoid 49 is connected by means 57, as best seen in FIG. 3, to the cam slider 41 to shift it to the right against the force of the spring 43 and against other forces encountered during movement of the slider 41 and movement of the pinch roller 47 into an inoperative position. For instance, it has been found that it is possible to reduce the cassette loading force of the illustrated apparatus by about 2 ½ to 3 pounds by use of the repeat solenoid to shift the cam slider 41 and pinch rollers 45 and 47 with the result that the manual loading force may be reduced to an amount, e.g. about 5 pounds of force, at which a lightweight apparatus 11 is less likely to slide on its support or to tilt relative thereto when inserting a cassette 17 therein.

Referring now in greater detail to the illustrated playing and recording apparatus 11, the carriage 21 operates in a known manner and is generally similar to the carriage disclosed in U.S. Pat. No. 3,385,534 in which the tape capstans 28 and 29 and the spindles 23 and 25 are carried on the carriage and driven by motors (not shown) and in the correct directions of rotation. As the basic electrical circuits and switch controls for the motors and for the tape transducer head 39 are well known, they will not be described or illustrated herein.

Figure 3:
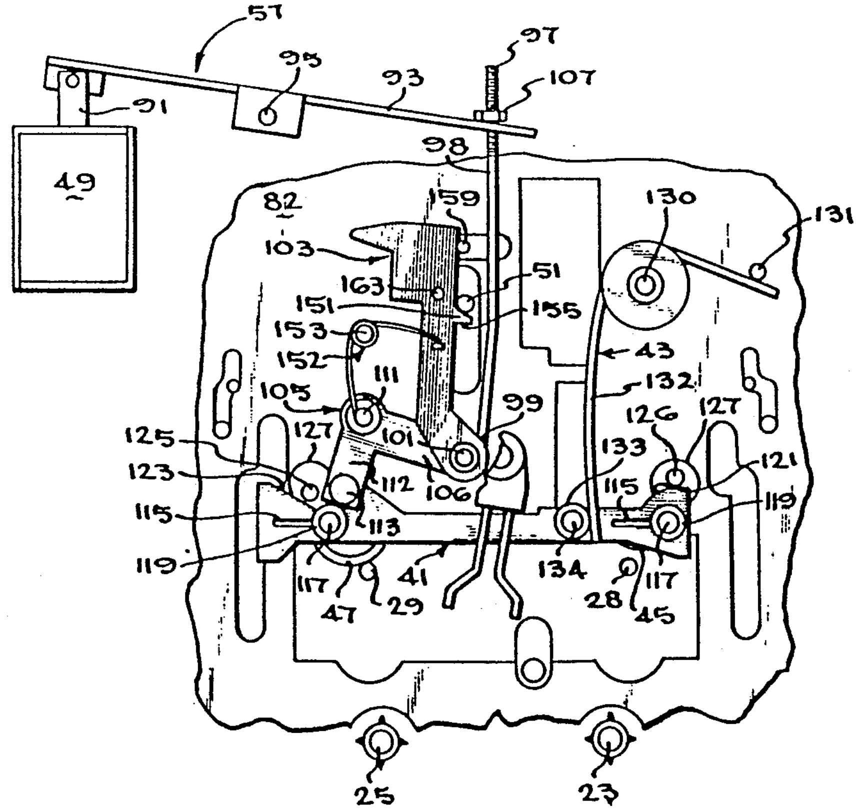
FIG. 3 is a fragmentary, bottom view of the apparatus of FIG. 1.

Briefly, the carriage 21 comprises a horizontally disposed chassis plate 59, as best seen in FIG. 2, which is suspended at four corners thereof on a parallelogram linkage for upwardly and rearwardly swinging movement when a leading edge 63 of the cassette 17 is abutting the lugs 19 which include an external hollow sleeve 65 and internal pin 67 which extends vertically and is fixed to the chassis plate 59. The parallelogram linkage comprises four links 69, each pivoted at their upper ends on horizontally disposed pivot pins 70 fixed to depending flanges 71 of a stationary frame 72. At their lower ends, each of the links is pivotally connected to a corner of the carriage 21 by horizontally disposed pivot pins 73 carried on depending flanges 75 of the chassis plate. As best seen in FIG. 2, the inward pushing of cassette 17 to the left causes the carriage plate 59 to stretch the pair of contractile return springs 33 which are connected at their forward ends to a stationary front panel 74 of the stationary frame 72 and which are connected at their other ends to a bracket 76 fixed to the underside of the carriage plate 59.

Figure 1:
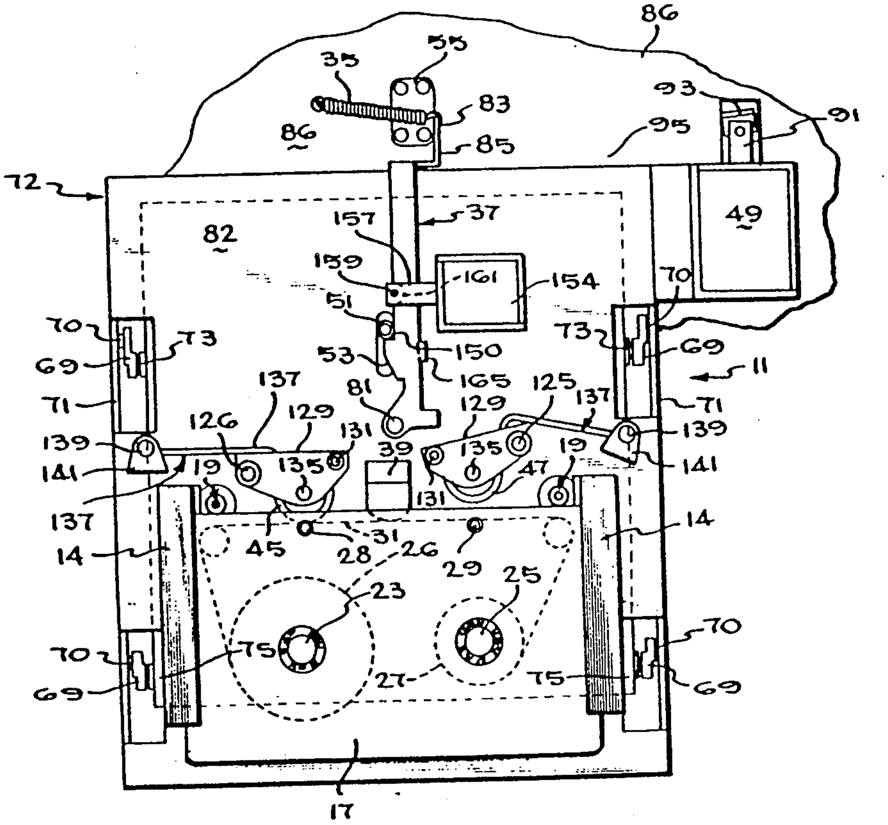
FIG. 1 is an illustrative, fragmentary, plan view of a portion of a playback and recording apparatus embodying the novel features of the invention.
Figure 5:
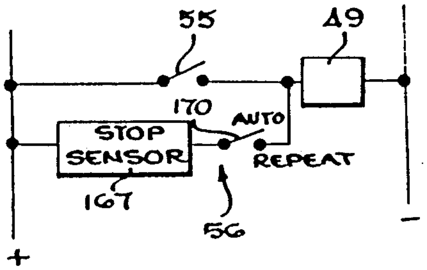
FIG. 5 is a schematic circuit for operating the apparatus of FIG. 1 to relieve the force required to load a tape cassette.
Figure 4:
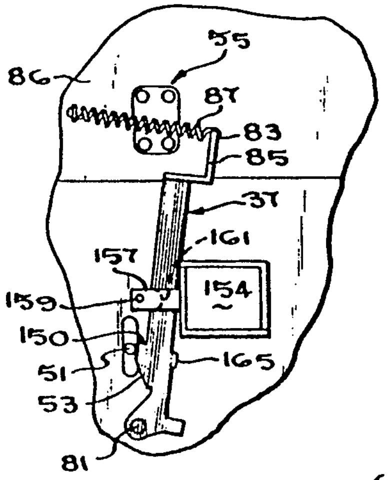
FIG. 4 is a fragmentary view of a lever and switch sensing means operable upon insertion of a cassette.

During the initial inward movement, e.g. 0.25 inch, of the carriage 21 by the cassette 17, the carriage 21 moves rearwardly the upstanding pin 51 to abut its roller 79 against the cam surface 53 on the latch pawl 37 and pivots the latch pawl in a clockwise direction, as illustrated in FIG. 1, about its upright pivot pin 81 fixed at its lower end to a stationary, horizontal plate 82 of the stationary frame 72. The upright pin 51 swings the latch pawl 37 against the force of its contractile return spring 35 which is hooked at one end 83 to a rearward free end 85 of the latch pawl. The pawl return spring 35 is fixed at its other end to a stationary bracket 86 secured to and extending rearwardly from the top stationary plate 82. This rearward end 85 of the latch pawl is biased to press a switch operating button 87, which is best seen in FIG. 4, of the electrical switch 55 which operates through a suitable circuit, such as shown in FIG. 5, to cause the solenoid 49 to energize or to deenergize. In this instance, the switch 55 closes and causes the energization of the solenoid 49 which, as will be explained, causes the cam slider 41 to be positioned against the force of the spring 43 to move the forward feed pinch roller 45 into engagement with the tape 31.

In this preferred embodiment of the invention, the solenoid 49 has a rearwardly extending plunger 91 which has its outer free end pinned to one end of a lever 93 which is pivotally mounted on a vertically extending pivot post 95 fixed to the stationary bracket 86 at its upper end and at its lower end to a lower spaced bracket (not shown). The other end of the solenoid operating lever is provided with an aperture through which projects a threaded end 97 of a link 98 which has its forward end fastened by means of a hook-like shaped portion 99 to a pivot pin connection 101 between a loading lever 103 and a bell crank 105 which is operably connected to the cam slider 41. A nut 107 is threaded on the free end of the solenoid link 98 to abut the lever 93 and is threaded to a position to provide the desired, adjusted length for the link.

The bell crank 105 serves to convert the rearward movement of the link 98 into a lateral sliding of the cam slider 41; and, to these ends, the bell crank is pivotally mounted on a pivot post 111 fixed to the underside of the plate 82 with one arm 106 connected at pin 101 to the link 98 and with another arm 112 connected by a pin 113 to the cam slider 41.

The cam slider 41 is guided for rectilinear movement in a direction transverse to the movement of the carriage 21 and functions to shift the forward feed pinch roller 45 or the reverse feed pinch roller 47 into operative engagement with the tape 31 at its associated rotating capstan 28 or 29. more specifically, the cam slider 41 is provided with a pair of elongated slots 115 adjacent the opposite ends thereof into which project guide pins 117 which are fixed at their upper ends to the stationary plate 82. The washers 119 are fastened to the pins on the underside of the cam slider to hold the same on the pins 117.

To shift the pinch rollers 45 and 47, the cam slider 41 has associated therewith cam means including cam surfaces 121 and 123 which are inclined relative to the direction of movement of the cam slider 41 and are brought into abutment with their respective cam followers 125 and 126 which project through openings 127 in the plate 82 to be engaged by one of the respective cam surfaces. The cam followers 125 and 126 are in the form of vertically extending rods which are fixed at their upper ends to swingable, pinch roller brackets 129 which carried the respective pinch rollers 45 and 47. As will be explained in greater detail, the cam 121 functions when the cam slider is moved to the left, as viewed in FIG. 3, to force cam follower 126 to swing its forward feed pinch roller 45 from the tape. Conversely, as will be explained in greater detail, positioning of the cam slider to the right, as viewed in FIG. 3, causes cam 123 to force the cam follower 125 to pivot the reverse feed pinch roller 47 from the tape.

The pinch rollers are mounted for rotation in brackets 129 which are generally channel shaped. Each bracket 129 is pivotally mounted at end thereof on a post 131 fastened to the upper side of stationary plate 82 at a location spaced from its respectively associated cam follower. The pinch rollers are journaled to turn on axles 135 carried between opposite channel walls of the brackets 129. The respective pinch roller brackets 129 are biased toward the tape 31 by biasing means in the form of leaf springs 137 which have a central portion coiled about a post 139 fixed to the plate 82 and which have one leaf or end 141 abutting the pinch roller bracket 129 adjacent its associated cam follower pin. The other end of each leaf spring 137 is fastened to a stationary retainer 141 secured to the top plate 82. Thus, each of the pinch rollers is biased by its respective spring 139 to move towards a capstan 28 or 29 to establish a feeding nip therewith for transporting the tape 31.

When the cam slider 41 is in the forward feed position for transporting the tape forwardly, the cam 123 will be abutting the follower 125 and pivoting its associated pinch roller bracket 129 to position the reverse feed pinch roller 47 at a position spaced from the tape. The other cam surface 121 on the cam slider will be positioned to the right, as viewed in FIG. 3, of the cam follower pin 126 with the leaf spring 43 being flexed. The leaf spring 43 has a center portion coiled about a post 130 fixed to the underside of the stationary plate 82 and has one end thereof abutting a pin 131 on the plate 82 and has another end 132 engaging a roller 133 on a post 134 carried by the cam slider 41.

Recapitulating, then, the energization of the repeat solenoid 49 in response to the operation of the switch 55 pivoted the lever 93 to pull rearward the link 98 which pivoted the bell crank 105 in a counterclockwise direction, as viewed in FIG. 3, with the result that the bell crank 105 shifted the cam slider 41 to the right against urging of the spring 43 and frictional forces tending to retard the cam slider movement. Movement of the cam slider to the right, as viewed in FIG. 3, resulted in cam 123 abutting cam follower 125 and forcing it rearward with its associated pinch roller bracket pivoting to shift the reverse feed pinch roller 47 rearwardly from the tape 31. At the same time, the cam surface 121 moves to the right and frees cam follower 126 of restraint whereby its associated pinch roller bracket 129 is swung by its spring 137 to bring the pinch roller 45 against the tape to establish a driving nip with the forward feed capstan 28. Thus, the forward pinch roller is positioned by the operation of the solenoid 49 to feed the tape in a forward direction and to play the first side of the tape.

During the shifting of the cam slider 41 by the repeat solenoid 49, the user was forcing the carriage 21 rearwardly and causing the pin 51 to move rearwardly of the cam surface 53 and rearwardly of a latching shoulder 150, as best seen in FIGS. 1 and 4, on the latching pawl 37. When the pin 51 moves rearwardly of the pawl latching shoulder 150, the latch pawl return spring 35 pulls the outer free end 85 of the pawl to abut and depress the switch button 87 and position the latch shoulder 150 in front of the pin 51. Closing of the switch 55 de-energizes the solenoid 49. The cam slider 41 however is latched and held against the force of the spring 43 as a nose 151 on the load lever 103 will be positioned rearwardly of and latched on the pin 51. More particularly, as the link 98 pulls the arm 106 of the bell crank rearwardly the load lever 103 was moved rearwardly from the position shown in FIG. 3 to a position in which a shoulder surface 155 on the load lever 103 abuts the pin 51 and is held thereby from moving forwardly to the position illustrated in FIG. 3. The carriage will now be in the operative position with the cassette tape 31 positioned for movement across the sound transducer head 39 and with the pin 51 positioned intermediate the nose 151 of the load lever and the latch shoulder 150 of the latch pawl 37, the latter holding the carriage 21 against forward movement by the carriage return springs 33.

A torsion spring 152 urges the load lever 103 into its latching position on the pin 51 during forward movement of the tape. More specifically, the torsion spring 152 has an end fastened to the load lever 103 and a coiled center portion 153 with its opposite end fastened to the stationary post 111 on which the bell crank 105 is pivotally mounted. As will be explained, the load lever 103 may be pivoted in a counterclockwise direction about its pivot post 101, as viewed in FIG. 3, against the urging of the torsion spring 152 to be unlatched from the pin 51.

After the tape on the reel 27 has been transported to and taken up on the other reel 26 of the cassette 17, the tape feed in the forward direction stops and this stopping is detected by conventional means (not shown) and a solenoid 154, which is illustrated in FIG. 1, secured to the top of the stationary plate 82 is energized. The solenoid 154 pulls in its plunger 157 to bring a pin 159 projecting at right angles from and fastened to the plunger 157 against the load lever 103 to pivot it in a counterclockwise direction, as viewed in FIG. 3, to a position to the left of the pin 51. As the load lever 103 is unlatched from the pin 51, the spring 43 connected to cam slider 41 is free to force the latter to the left and thereby through pin 113 pivot the bell crank 105 clockwise and pull the load lever 103 forwardly until the nose 150 thereon is forward of the pin 51.

Thus, as viewed in FIG. 3, the spring 43 shifts the cam slider 41 to the left, during which shifting, cam 121 abuts the follower pin 126 and forces it rearwardly to move the forward feed pinch roller 45 to a position spaced from the tape while the opposite cam 123 moves to the left of the cam follower 125 thereby allowing the reverse feed pinch roller 47 to be swung by its spring 137 into engagement with the tape 31 and to establish a tape transport couple with the capstan 29.

During this first operation of this solenoid 153, the latch lever 37 remains stationary as the pin 159 on the solenoid plunger 157 merely moves within a notch 161, FIGS. 1 and 4, in the latch pawl 37. An upstanding stud 163 on the loading pawl 103 is carried forwardly as the loading pawl moves forwardly into a position aligned with a downwardly bent tab 165 (FIGS. 1 and 4) on the latch pawl 37 so that upon the second energization of the solenoid 154 the loading pawl stud 163 will abut the tab 165 and pivot the latch pawl 37 to its release position.

When a tape sensor circuit 167 (FIG. 5) senses the stopping of the tape transport in the reverse direction, the solenoid 149 is energized a second time to retract its plunger 157 and pivot the loading pawl 103 to swing its stud 163 which abuts the tab 165 on the latch pawl 137 to pivot the latch pawl 37 in a clockwise direction, as seen in FIG. 1, about its pivot pin 81. Thus, the latch shoulder 150 on the latch pawl moves from and releases the carriage pin 51. When the latch pawl shoulder 150 is positioned to the right of the pin 51, the carriage return springs 33 are free to pull the carriage 21 forwardly to its initial position and to swing the carriage 21 downwardly and forwardly with the carriage supporting links 69 pivoting about their upper pivot pins 70. As the carriage 21 pivots, it withdraws the spindles 23 and 25 from the cassette reels 26 and 27 and the capstans 28 and 29 from the openings in the cassette 17. The cassette is slid forwardly within the guides 14 by the carriage lugs 19 until a portion thereof projects for grasping by the user of the apparatus.

When latch pawl 37 was pivoted by operation of the solenoid 154, its rearward end 85 also swung from the switch 55 whereby the repeat solenoid 49 is again energized to place the cam slider 41 in position but as carriage pin 51 is not in position to latch the load lever 103, the cam slider 41 will be returned by the spring 43 when the repeat solenoid 49 de-energizes.

If the apparatus had been placed in a repeat mode by operation of a manual repeat control switch 170, FIG. 5, on the apparatus, the sensing of the stopping of the tape transport by a tape stop sensor such as for example disclosed in U.S. Pat. No. 3,488,017 after playing track two would result in the energizing of the repeat solenoid 49 rather than the energizing of the solenoid 154 with the consequence that the latch pawl 37 would have remained stationary latching the carriage pin 51 and the carriage 21 against return movement. However, the operation of the repeat solenoid would shift cam slider 41 to the right, as viewed in FIG. 3 to place the surface 155 on the load lever nose rearwardly of the pin 51 to again latch the load lever 103 to hold the cam slider in position to cause the tape to feed forwardly.

As an aid to understanding the invention, a brief description of the operation of the illustrated apparatus will be given. As the cassette 17 is inserted into the guides 14 to abut the upstanding lugs 19 on the carriage 21, the person inserting the cassette begins to feel a resistance of the carriage return springs 33. Further exertion of an inward force results in the carriage 21 swinging upwardly to insert the capstans 28 and 29 into the cassette and to insert the rotatable spindles 23 and 25 into the respective tape reels in the cassette. During the initial ¼ inch movement of the carriage, the upstanding pin 51 thereon abuts the cam surface 53 on the latch pawl 57 and pivots it clockwise, as viewed in FIGS. 1 and 4, stretching the spring 35 and closing the switch contacts 55 to cause the repeat solenoid 49 to energize, as is diagrammatically illustrated in the circuit 56.

Energization of the repeat solenoid 49 pivots the lever 93 to pull the link 98 rearwardly and pivot the bell crank 105 to slide the cam slider 41 against the force of the cam slider return spring 43 which is a relatively strong spring force. The movement of the cam slider 41 also cams the reverse feed pinch roller bracket 129 rearwardly against the urging of its spring 137. Thus, the repeat solenoid overcomes both of the springs 49 and 137 as well as friction forces and the inertia of moving these various elements; and hence the person inserting the cassette and moving the carriage need apply a significantly reduced amount of force, for example, a reduction from about 9 pounds to 5 pounds of force, to insert the cassette into the operating position at which the carriage is latched by the pin 51 being rearwardly of a shoulder 150 on the latch pawl 37 which is returned by its spring 35 to close the switch 55 and thereby de-energize the repeat solenoid 49.

Although the repeat solenoid 49 has been used herein to provide the dual functions of causing a repeat operation as well as a load easing operation, an additional and separate solenoid or other device could be used in lieu of the repeat solenoid for operation by the sensing means to shift mechanisms to relieve the amount of manual force needed to push the cassette and its carriage into the operative position. Also, by the same token, another sensing means could be used in lieu of the surface 53 and its latch pawl 37. However, it is preferred to use the latch pawl 37 to perform the dual functions of sensing and operating the switch 55 and latching the carriage 21 in the operative position relative to the sound transducer head 39.

From the foregoing, it will be seen that the present invention requires relatively little modification to provide a sensing means and a means for shifting the tape transport cam slider. Yet, the amount of force reduction is significant. This is, of course, important where the number of operating parts and their interrelationships are already quite complicated as in a tape playback and/or recording apparatus.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. An apparatus for receiving a tape cassette upon the manual insertion of the cassette into the apparatus, said cassette having a pair of tape reels between which a magnetic tape is transported during a playback or recording operation, said apparatus comprising a swingable carriage mounted for swinging movement from a cassette receiving position to a cassette playing position against a return biasing force when said carriage is engaged and pushed by said cassette, tape driving capstans and reel engaging spindles on said carriage for movement into operative position with said cassette as said carriage is swung towards the cassette playing position, means for sensing movement of said carriage by said cassette, means including a solenoid operable by said sensing means, a first pressure member for cooperation with a first one of said capstans to transport the tape in a forward direction, a second pressure member for cooperation with a second one of said capstans to transport the tape in a reverse direction, means including a biasing means and a slider biased thereby to selectively position said first or second pressure member for cooperation with its associated capstan, said biasing means urging said slider to position said second pressure member in cooperation with said second capstan to transport the tape in the reverse direction, said means including said solenoid being operable to shift said slider against the force of said biasing means to position said second pressure means for cooperating with said first capstan to transport said tape in a first direction independently of the manual force being exerted on the carriage through said cassette thereby relieving the amount of manual force required to insert the cassette into playing position.

2. An apparatus for receiving a tape cassette upon the manual insertion of the cassette into the apparatus, said cassette having a pair of tape reels between which a magnetic tape is transported during a playback or recording operation, said apparatus comprising a swingable carriage mounted for swinging movement from a cassette receiving position to a cassette playing position against a return biasing force when said carriage is engaged and pushed by said cassette, tape driving capstans and reel engaging spindles on said carriage for movement into operative position into said cassette as said carriage is swung towards the cassette playing position, means for transporting said tape in a forward or a reverse direction and cooperable with said capstans to cause transporting of said tape, means for sensing movement of said carriage by said cassette, and means operable by said sensing means to shift said tape transporting means into position to transport said tape in a first direction independently of the manual force being exerted on the carriage through said cassette thereby relieving the amount of manual force required to insert the cassette into playing position, a latch means including a latch pawl for latching said carriage in the cassette playing position against said return force, and pin means on said carriage cooperating with said latch means to hold said carriage in said latch position, said sensing means including a cam surface on said latch pawl engaged by said pin means for swinging said latch pawl to a switch operating position, said sensing means further including a switch operable by said latch pawl to cause said means to shift said tape transporting means.

3. An apparatus for receiving a tape cassette upon the manual insertion of the cassette into the apparatus, said cassette having a pair of tape reels between which a magnetic tape is transported during a playback or recording operation, said apparatus comprising a swingable carriage mounted for swinging movement from a cassette receiving position to a cassette playing position against a return biasing force when said carriage is engaged and pushed by said cassette, tape driving capstans and reel engaging spindles on said carriage for movement into operative position into said cassette as said carriage is swung towards the cassette playing position, means for transporting said tape in a forward or a reverse direction and cooperable with said capstans to cause transporting of said tape, means for sensing movement of said carriage by said cassette, and means operable by said sensing means to shift said tape transporting means into position to transport said tape in a first direction independently of the manual force being exerted on the carriage through said cassette thereby relieving the amount of manual force required to insert the cassette into playing position, said last mentioned means including a solenoid operable by said sensing means during insertion of a cassette and selectively operable means are provided for operating said solenoid independently of said sensing means to provide a repeat playing of said tape after said cassette tape has noen fed forwardly and reversely for a first time.

4. In an apparatus for playing back or recording on a tape of a tape cassette and having a repeat mode of operation, means for transporting said tape in a forward direction and for transporting the tape in a reverse direction, a repeat means including a repeat solenoid selectively operable when said apparatus is positioned in a repeat mode to shift said transporting means to a position to transport said tape in the forward direction for a second time, a movable carriage for receiving said tape cassette and for being moved with manual force exerted on said cassette to position said cassette at said tape playing position and a sensing means for sensing movement of said carriage and tape cassette and for operating said repeat solenoid to shift said transporting means independently of the manual force being exerted on said carriage thereby alleviating the amount of force needed to position said cassette at said playing position.

5. An apparatus for receiving a tape cassette having a pair of reels between which a magnetic tape travels as it is wound on one reel and unwound from the other reel, said apparatus comprising means for receiving the cassette and for guiding the same along a path of movement to an operating station for a playback or a recording operation, a movable carriage having tape driving capstans and reel engaging spindles thereon, means on said carriage engageable by said inserted cassette and operable thereby to shift said carriage from a cassette receiving to the cassette operating station at which said capstans are projected into said cassette and said spindles are inserted into said reels, a first pinch roll for cooperation with one of said capstans to transport said tape in a forward direction, a second pinch roll for cooperating with another one of said capstans to feed said tape in a reverse direction, means including a slider for shifting one of said pinch rollers into operative position while holding the other one of the pinch rollers in an inoperative position, spring means biasing said shifting means to position said second pinch roller in position to transport said magnetic tape in said reverse direction, a pin on said movable carriage for operating said pinch roller shifting means to slide said slider against the urging of said spring means into a position to cause said first pinch roller to engage said tape, a latch pawl for latching said pin to hold said movable carriage in said operating position, a cam surface on said latch pawl engageable with said pin to pivot said latch pawl during the insertion of said cassette and movement of said carriage thereby, switch means operable to a first state by pivoting of said latch pawl, means including a repeat solenoid operable in a repeat mode to shift said means for shifting said pinch rollers to position said first pinch roller to transport said tape a second time in the forward direction upon completion of tape transport in the reverse direction, and circuit means operable by said switch means in said first state to cause said repeat solenoid to operate said slider against the urging of said spring means to move said first pinch roller into position to engage said tape thereby relieving the user from manually overcoming the force of said spring means.

6. An apparatus in accordance with claim 5 in which said means including a repeat solenoid comprises a lever operated by said repeat solenoid, and means linking said lever and said means including the slider.

7. An apparatus in accordance with claim 6 in which said means including the slider comprises a load lever movable by said pin to shift said slider, cam means associated with said slider to swing said pinch rollers between operative and inoperative positions, and in which said linking means connects said load lever and said lever operated by said repeat solenoid.

* * * * *

UNITED STATES PATENT OFFICE
CERTIFICATE OF CORRECTION

PATENT NO. : 3,724,779

DATED : April 3, 1973

INVENTOR(S) : Robert J. Fanella et al

It is certified that error appears in the above-identified patent and that said Letters Patent are hereby corrected as shown below:

Column 8, line 58, change "second pressure means" to --first pressure member--.

Column 8, line 60, change "a first" to --the forward--.

Column 9, line 56, change "noen" to --been--.

Signed and Sealed this

Twenty-second Day of March 1977

[SEAL]

Attest:

RUTH C. MASON
*Attesting Officer*

C. MARSHALL DANN
*Commissioner of Patents and Trademarks*